United States Patent Office 2,898,266
Patented Aug. 4, 1959

2,898,266

CONTROL OF PLANT DISEASES OF ASCOMYCETES ORIGIN EMPLOYING N-PHENYL-DICHLORO-MALEIMIDE

Robert L. Gates, Medina, N.Y., assignor to Food Machinery and Chemical Corporation, San Jose, Calif.

No Drawing. Application November 28, 1956
Serial No. 624,741

2 Claims. (Cl. 167—33)

The present invention relates to a composition for and method of controlling plant diseases and particularly those diseases which are known as Ascomycetes, whether the disease attacks the foliage or the fruit.

This broad class of disease caused by Ascomycetes causes particular damage resulting in decreased yields of vendable product and in many instances the disease penetrates the foliage and establishes lesions which cause defoliation to a considerable degree. Thus apple scab caused by the disease organism *Venturia inaequalis* is probably the most serious disease to which apples are subject, at least in the eastern portion of the United States of America. The disease penetrates the leaves and establishes lesions which will cause the leaves to defoliate thereby weakening the tree and reducing yield of fruit. The disease may also attack the fruit causing lesions therein which reduce the quality of the fruit and may even prevent the sale of the fruit in the fresh fruit market. At times, the disease may be so widespread in the fruit as to prevent their acceptance even for processing, thus rendering the fruit worthless.

The apple is also subject to an Ascomycetes-caused disease, namely *Podosphaera leucotricha*, which disease is particularly prevalent in the irrigated regions of the Pacific Northwest. This disease attacks young succulent leaf and twig growth. It spreads rapidly over the surface of leaves and twigs causing chlorosis and deformation and, if uncontrolled, causes death of the leaves and twigs. The disease may, therefore, weaken the tree and the mycelium over wintering in twigs and fruit buds causing shriveled blossoms and no fruit in the following year. Another disease of Ascomycete origin is peach leaf curl caused by *Taphrina deformans*. This disease occurs in substantially all peach-growing areas of the world. This causes deformation and chlorosis of leaves emerging from over wintering buds which condition leads to defoliation of all affected leaves. The result of the disease is to weaken the tree, reduce the yield and, if uncontrolled, the tree may die after several successive years of attack by the disease.

Cucurbits are subject to *Erysiphe cichoracearum*, a disease of Ascomycetes origin. Symptom of this disease is the formation of a powdery growth over the leaf and stem surfaces sapping the strength of the infected parts, thereby reducing yield of the cucurbits with eventual death of the plant.

*Cercospora apii* or celery blight is found in varying abundance wherever celery is grown. The disease results in minute yellow areas which change to large, irregular, ash-gray lesions which disfigure the celery leaf and make it unacceptable for market.

A disease of roses of Ascomycetes origin is caused by *Sphaerotheca humili* and *S. pannosa*. The mycelium of the organism producing this disease spreads rapidly over the leaves and shoots, giving them an unsightly appearance and deforming the leaves and even preventing the flowers from opening. The disease is of particular importance to industrial growers since the value of roses grown for market is reduced when the foliage may not be included with the stems for sale.

In accordance with the present invention these plant diseases, all of Ascomycetes origin, may be controlled and eradicated by application to the plant of a composition containing as active ingredient an N-phenyldichloromaleimide. N-phenyldichloromaleimide may, therefore, be used as a protectant against Ascomycetes-caused diseases attacking plant foliage and fruit and as an eradicant in certain instances of the disease, notably apple scab caused by *Venturia inaequalis*.

The N-phenyldichloromaleimide may be employed either as a protectant or an eradicant of the Ascomycetes disease and the time of application, application rate, and the number of applications will be dictated by the condition of the plant whether free of disease or whether suffering from disease, and the type of plant and specific disease. In general, the application is made by dispersing the N-phenyldichloromaleimide in an extender and carrier in order more carefully to regulate the amount of active material applied. The carrier or extender may be a finely divided solid or it may be a liquid.

Generally the N-phenyldichloromaleimide will be applied as a wettable powder in which case the formulation will contain a wetting agent such as the alkali metal sulfates of long chain aliphatic alcohols, sorbitol esters, arkyl-aryl sulfonates, as well as others, all materials normally added to wettable powders. The solid, finely ground, inert carrier or extender may be, for instance, kaolin, silica, diatomaceous earth, talc, whiting and various clays.

The active ingredient in the formulation, for most uses, will be present from about 2% to 98% with the remainder inerts, although in special applications the active ingredient may be applied without an inert admixed therewith where the disease may be particularly rampant.

Due to the large production and consumption of apples and need for control of Ascomycetes disease thereof, the present invention finds greatest application in the area of apple growth and the invention will be specifically illustrated with respect thereto. The *Podosphaera leucotricha* is extremely serious in its attack in apple orchards, with extreme reduction in amount of vendable fruit produced. When apples are treated in accordance with this invention it may be found necessary to make several applications of the specific control medium particularly when attempting to control *Venturia inaequalis* in a preventative control program. Thus the application of the specific will depend upon temperature and moisture conditions. The first application in such a preventative program would be recommended at a period of time when the leaf buds begin to crack or open. To obtain control of any diseases likely to start in the foliage, additional applications will be dictated whenever temperature and moisture conditions, that is temperatures above about 40° F. (humid or rainy conditions), favor addditional generation of the diseases. Thus it may be necessary in a particular growing season to make as many as 8 or 10 applications to the diseased tree and fruit.

Heretofore in the treatment of the diseases of apples, known as *Venturia inaequalis*, where the disease has become entrenched and is particularly rampant, that is, a condition where the mycelium has entered the foliage or the fruit, it has become necessary to employ stringent measures to eradicate the disease, mercury compounds being recognized as probably the most efficient of all control and eradicant materials.

By using the specific of the present invention, namely N-phenyl dichloromaleimide, it is possible to eradicate the disease after rampant infection has occurred. As a specific illustration of the formulations suitable, there may be mentioned the following:

(1) Where the diseased tree or fruit, or both, may be treated with a dust and not require a severe application of the specific, N-phenyl dichloromaleimide, the specific may be carried in a finely ground diluent of any of the usual dust inerts normally employed in the preparation of dusts, as for instance clay, fuller's earth, pyrophyllite, gypsum, nut shells, such as walnut hulls. The specific may be present from about 1% to 15% and will generally be found quite effective for usual conditions at about 6%, the remainder being finely ground inert diluent or carrier.

(2) Where it is desired to employ the specific in a wet spray with water, it may be directly dispersed therein and sprayed in the usual manner. It may be found desirable to include a wetting agent, and any of the commercially available materials may be employed to this end, as for instance sodium lignosulfonate and sulfonated aliphatic polyesters, among others. A suggested formulation of wettable powder in such an event is as follows:

96% N-phenyl dichloromaleimide
2% sodium lignosulfonate (Marasperses N)
2% sulfonated aliphatic polyester (Nekal WS-21)

(3) Wettable powders containing wetting agents and considerable amount of finely ground inert, in addition to the specific are recommended, and the N-phenyl dichloromaleimide may be present from a few percent to 70% to 80% of the total formulation, although for usual disease conditions encountered, the dry wettable formulation will contain generally from about 30 to 60% active content. In addition to the finely powdered inert diluent, the final dry wettable formulation will contain a wetting agent as is general practice in the manufacture of dry wettable powders. An all purpose dry wettable formulation is given below:

56% N-phenyl dichloromaleimide
30% fuller's earth (Attaclay)
16% kaolin (Palmetto clay)
2% sodium lignosulfonate (Marasperse N)
2% sulfonated aliphatic polyester (Nekal WS-21)

In using a typical formulation, such as any of those illustrations above, sufficient of the active ingredient or formulation of active ingredient with inorganic powder, may be used in concentrations of from ½ lb. to 2 lb. per 100 gallons of water at an application rate of from 5 to 15 gallons per tree. Or, in special circumstances, where concentration spray applicators are available, the concentration may be increased to as much as 10 times that given.

In a typical test where applications were made at concentrations of (a) ½ lb. of active ingredient per 100 gallons of water, (b) 1 lb. of active ingredient per 100 gallons of water, and (c) 2 lb. active ingredient per 100 gallons of water, one half of the trees in a test plot was treated and the lesions counted and compared with the lesions found on the untreated trees of the test plot. The lesions per thousand leaves in the trees in the treated plots averaged approximately one lesion per thousand leaves. Lesion counts per thousand leaves in trees present in the untreated portion of the plot averaged 260 lesions per thousand leaves. These results were obtained upon eradicative treatments where the application was made at approximately 48 hours after infection had begun and wherein there was favorable temperature and humidity conditions for the spread of the infection. This is indicated by the high lesion count in the untreated plot. Similar results are obtainable when using dry dusts.

Extensive results of further experiments are given in the tables below.

TABLE 1

*The relative activity of N-phenyldichloromaleimide in controlling apple scab infections on a protective schedule*

FOUR-TREE PLOTS

| Active Ingredient in Formulation, percent | Active Ingredient added to 100 gals., lbs. | Scab Resulting from Infection Periods | | Fruit with Primary Scab,[3] percent |
|---|---|---|---|---|
| | | Apr. 14-26 [1] | May 25-27 [2] | |
| | | Scab Lesions/1,000 leaves | | |
| 50 | 1 | 5 | 0 | 0.3 |
| 50 | 2 | 3 | 0 | 0 |
| None | None | 3,268 | >30,000 | 97.0 |

TWO-TREE PLOTS

| | | | | |
|---|---|---|---|---|
| 50 | 1 | 0 | 0 | 0 |
| None | None | 735 | 10,533 | 47.8 |

[1] Data taken May 17 or May 20 on cluster bud leaves.
[2] Data taken June 14 or June 15 on terminal leaves.
[3] Data taken at harvest on all fruit in the trees.

TABLE 2

| Active Ingredient in Formulations, percent | Active Ingredient Added per 100 gallons, lbs. | Infection Periods [1] Falling Between 4/28 and 5/3 | | | |
|---|---|---|---|---|---|
| | | Scab Lesions/1,000 leaves, number | | Scabby Fruit/1,000 apples, number | |
| | | Expt. 1 | Expt. 2 | Expt. 1 | Expt. 2 |
| 96 | 0.24 | 0 | 1 | 1 | 5 |
| 96 | 0.48 | 0 | 0 | 1 | 8 |
| 96 | 0.96 | 0 | 0 | 6 | 0 |
| None | None | 282 | 576 | 554 | 779 |

[1] Leaf counts taken on June 14; fruit counts taken on June 28-29.

The above shows the relative activity of N-phenyldichloromaleimide at three rates of application in controlling apple scab infections on foliage and fruit.

TABLE 3

| Active Ingredient in Formulations, percent | Active Ingredient Added per 100 gals., lbs. | Infection Period Beginning 4/28 [1] | |
|---|---|---|---|
| | | Scab Lesions/1,000 leaves, number | Scabby Fruit/1,000 apples, number |
| 96 | 0.48 | 0 | 8 |
| 96 | 0.96 | 0 | 3 |
| 96 | 1.92 | 0 | 0 |
| None | None | 260 | 681 |

[1] Leaf counts taken June 1; fruit counts taken June 27.

The above shows relative apple scab "eradicative" activity of N-phenyldichloromaleimide at three rates of application when applied 41 hours after the begining of an infection period.

The employment of N-phenyldichloromaleimide for the control and eradication of plant diseases of Ascomycetes origin is not attended by adverse phytotoxic action upon the plant or fruit. Best results are obtainable when the plant is sprayed when weather conditions occur or are imminent which favor infection, periods of high humidity and relatively low temperature in the neighborhood of 40° F. to 50° F. In so far as apple trees are concerned, this may require several treatments on a schedule dictated by weather conditions to produce fruit entirely free of the ravages of the disease.

What is claimed is:

1. The method of controlling the spread of diseases of Ascomycetes origin in plants which comprises applying N-phenyldichloromaleimide in toxic concentration to the area of the plant subject to the disease.

2. The method of controlling the spread of diseases of Ascomycetes origin in plants which comprises spraying N-phenyldichloromaleimide in toxic concentration to the area of the plant subject to the disease.

References Cited in the file of this patent

UNITED STATES PATENTS

| | | |
|---|---|---|
| 2,205,558 | Flett | June 25, 1940 |
| 2,726,981 | Wolf | Dec. 13, 1955 |